(12) United States Patent
Dixon et al.

(10) Patent No.: US 6,430,344 B1
(45) Date of Patent: Aug. 6, 2002

(54) COMMUNICATION CABLE HAVING ENHANCED CRUSH RESISTANCE

(75) Inventors: Lisa A. Dixon, Atlanta; Richard H. Norris, Powder Springs; Richard D. Small, Lilburn; Peter A. Weimann, Atlanta, all of GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/792,735

(22) Filed: Feb. 23, 2001

(51) Int. Cl.[7] .................................................. G02B 6/44
(52) U.S. Cl. ......................... 385/109; 385/113; 385/141
(58) Field of Search ................................. 385/100–113

(56) References Cited

U.S. PATENT DOCUMENTS

| | | | | |
|---|---|---|---|---|
| 4,078,853 | A | 3/1978 | Kempf et al. | 350/96.23 |
| 4,730,894 | A | 3/1988 | Arroyo | 350/96.23 |
| 4,826,278 | A | 5/1989 | Gartside et al. | 350/96.23 |
| 4,844,575 | A | 7/1989 | Kinard et al. | 350/96.23 |
| 5,082,348 | A | 1/1992 | Gartside et al. | 385/111 |
| 5,109,457 | A | 4/1992 | Panuska et al. | 385/102 |
| 5,131,064 | A | 7/1992 | Arroyo et al. | 385/102 |
| 5,514,734 | A | * 5/1996 | Maxfield et al. | 523/204 |
| 5,574,816 | A | 11/1996 | Yang et al. | 385/109 |
| 5,751,880 | A | 5/1998 | Gaillard | 385/109 |
| 5,838,864 | A | 11/1998 | Patel et al. | 385/113 |
| 5,896,482 | A | 4/1999 | Blee et al. | 385/107 |

OTHER PUBLICATIONS

"Microstructural Effects on the Properties of Injection Molded Nylon 6 Nanocomposites," Akkapeddi, Proceedings of 1999 ANTEC—Society of Plastics Engineers, 1999, 4 pages.

"Advances in Nanomer® Additives for Clay/Polymer Nanocomposites," Lan, Liang, Beall and Kamena; Nanocor website (www.nanocor.com), 1999, 8 pages.

U.S. Patent Application entitled "Hybrid Strength Member For An Optical Cable," filed by Norris, et al. on Oct. 8, 1999 and accorded serial No. 09/415,881, 18 pages (including drawings).

U.S. Patent Application entitled "Communication Cable Having Reduced Jacket Shrinkage," filed by Dixon, et al. on Jan. 12, 2000 and accorded serial No. 09/481,186 20 pages (including drawings).

U.S. Patent Application entitled "Communication Cable Having Reduced Jacket Shrinkage," filed by Dixon, et al. on Oct. 26, 2000 and accorded serial No. 09/697,339, 25 pages (including drawings).

* cited by examiner

*Primary Examiner*—Hung N. Ngo
(74) *Attorney, Agent, or Firm*—Thomas, Kayden, Horstemeyer & Risley, LLP

(57) ABSTRACT

A communications cable is disclosed herein that includes an outer jacket, and either a core tube or at least one buffer tube. The core tube or at least one buffer tube includes a resin and high aspect ratio fillers that occupy a predetermined volume of the core tube or buffer tubes so as to impart crush resistance to the cable. Further, the core tube or buffer tube may include two layers, an outer layer and an inner layer, in which the outer layer includes both a resin and high aspect ratio fillers, and the inner layer includes the resin without the high aspect ratio fillers.

29 Claims, 2 Drawing Sheets

COMMUNICATION CABLE HAVING ENHANCED CRUSH RESISTANCE

TECHNICAL FIELD

The present invention is generally related to a communication cable and, more particularly, is related to the core and buffer tubes of such cables.

BACKGROUND OF THE INVENTION

Optical fiber cables have been used for many years to transmit information at high rates and very long distances. The transmission media of the optical fiber cable are hair-thin optical fibers protected from external forces and elements by precisely designed and manufactured cable structures. There are several relatively common cable structure families currently being used to protect these hair-thin optical fibers. Such cable structure families include the loose tube, the central core, and the tube-in-tube structures.

Optical fibers are relatively delicate, compared to previous types of communication media. Typically made of glass, the fibers are not ductile and can be broken or cracked, either of which can destroy or degrade the signal being transmitted. Therefore, optical fibers are housed in rugged cable structures to protect the fibers from mechanical damage during both installation and service. During installation, the cable structure can see substantial compressive and tensile stresses, e.g., while being pulled into ground conduits. After installation, the cable structure can be damaged mechanically by gnawing rodents, or from crushing due to sharp impacts. In addition, the quality of a signal transmitted through an optical fiber is also sensitive to tensile or compressive stresses applied to the cable structure, e.g., those encountered during bends or turns in the cable route, or while suspended between telephone poles. Stresses encountered during service may change significantly as a result of environmental temperature variations, which cause expansion and contraction of cable components.

Accordingly, the components used in each type of cable structure are designed to protect the delicate optical fibers from mechanical and environmental stress. In a loose tube cable, the fibers are contained within multiple rigid, thick-walled extruded buffer tubes that are twisted and bound together. In a central core cable, all of the fibers are contained within a single extruded plastic tube. The tube-in-tube design is a modification of the central-core structure, in which the fibers are contained in flexible thin-walled extruded tubes. Multiple tubes are subsequently placed within a larger extruded tube, similar to that used in central-core cables. In all of these design families, the tube(s) typically also contain a thixotropic, petroleum-based gel to block water penetration and provide some mechanical protection to the fiber.

In all cases, the structure(s) containing the fiber are then sheathed in a continuous, high speed extrusion operation. In each design family, the majority of tensile loads are carried by various types of tensile stiffness members included in the cable, e.g., steel wires, rigid epoxy/glass rods, flexible epoxy/glass rovings, or aramid yards.

However, the mechanism of protection against compressive loads and sharp impacts is different in each cable design family. In the central core structure, resistance to compression is typically provided by the combination of rigid strength members included in the outer plastic sheath, the extruded plastic core tube, the extruded plastic outer jacket, and the thixotropic cable gel. In this design, inexpensive polyolefins are typically used for both the core tube and jacket. The majority of the resistance to compression is typically provided by relatively large rigid strength members, which provide resistance to both tensile and compressive stress. Cables in the tube-in-tube design family utilize sheaths similar or identical to those used for central core cables, with compressive resistance typically derived from rigid strength members within the outer extruded plastic jacket.

In the loose tube cable family, the buffer tubes are generally stranded around a rigid steel or epoxy/glass rod at the core of the cable, and this strength member does not provide resistance to compressive stresses or crushing. As such, the plastic tubes, the thixotropic gel, and the extruded polyolefin sheath must provide the majority of the resistance to compressive stress. Traditionally, the individual tubes have relatively thick walls, and have been fabricated from costly, high-modulus engineering plastics such as poly (butylene terephtalate) and polycarbonate. The thick tube walls can lead to undesirably large cable diameters, making it difficult to install cables in crowded or small cable ducts.

In all of these designs, some resistance to compressive deformation is provided by the thixotropic waterblocking gel contained within the tube or tubes. As these gels are incompressible, they also tend to impart some compression/crush resistance to cables. However, typical cable gels are generally a nuisance during cable installation. Fibers must be completely clean prior to splicing during installation, a process that takes a long time, as gels are typically sticky and hard to remove. Therefore, it is desirable to reduce or eliminate the amount of gel used in future cable designs. One of the benefits of the tube-in-tube design is minimization of gel usage. See for example, U.S. Pat. No. 5,155,789, to Le Noane. et al. and U.S. Pat. No. 5,751,880 to Gaillard. In other cable designs, the gel may be eliminated completely, e.g., U.S. Pat. Nos. 4,909,592 and 5,410,629, both to Arroyo and European Patent No. 0 945 746 A2 to Okada. However, minimization or removal of the cable gel tends to reduce resistance to crush or compressive deformation.

Illustratively, U.S. Pat. No. 5,131,064 to Arroyo, et al., discloses a central core cable having strength rods and a lightning-protective sheath system comprising a thermal barrier, which are disposed between the core of the cable and its plastic jacket. The thermal barrier comprises a textile of glass yarns that have been woven into a unit and then sandwiched between a pair of tapes together with a water-blocking material such as a superabsorbent powder. The glass yarns undulate in the longitudinal direction, not only because of their weaving pattern, but also because the tape follows the undulations of a corrugated metallic shield. Such undulations preclude the tape from receiving any portion of the load until the cable has already been elongated. Because the disclosed tape has a very low tensile strength, 420 Newtons per centimeter of width, the cable tensile strength effectively comes from rigid strength rods that are embedded in the plastic jacket. In addition, the majority of the resistance to compression comes from these rigid rods as well. However, these rods are less flexible than the woven tape, thereby reducing the flexibility of the entire cable. Further, if a pair of rods are used and are positioned diametrically opposite each other on either side of the core, they make the cable inflexible in all but one plane and much more difficult to handle and install.

Another example is U.S. Pat. No. 4,730,894 to Arroyo, which discloses an optical fiber cable that includes a plurality of equally spaced strength members disposed on a carrier tape and held in place by an adhesive. Once a plastic jacket is extruded onto the strength members, they are coupled to the jacket and provide tensile strength to the cable. Typically, these strength members will be rigid epoxy-glass composites, which will provide for both tensile and compressive stiffness. However, increased compressive stiffness correlates to increased flexural stiffness and, therefore, decreased cable flexibility, which makes cables more difficult to handle and to install. To protect the valuable optical fibers, cable flexibility generally has been sacrificed in conventional cables.

Yet a further example, U.S. Pat. No. 5,838,864 to Patel et al., discloses a cable with a dielectric strength member system that attempts to maximize the flexibility of the cable by using a flexible woven strength tape to carry to majority of the tensile loads. To control post-extrusion shrinkage and provide for some resistance to compressive stress, two rigid epoxy-fiber rods are embedded in the jacket, diametrically opposite one another, on either side of the core. However, as these rods do not have to carry tensile load, their size is minimized and, therefore, the overall cost of the strength system is reduced. Further, the volume of jacket material required to encase the smaller strength rods is less than for larger rods, further reducing the cost of the overall cable sheath. Still, the strength system is more expensive and complex than is desirable because of the need for two types of strength systems.

Therefore, there appear to be fundamental deficiencies in the mechanisms used for providing for resistance to compressive deformation and crushing in loose-tube, central-core, and tube-in-tube fiber optic cables. Known central-core and tube-in-tube sheath designs require large rigid strength members which make the cable more expensive, stiff, and difficult to handle. Known loose tube sheath designs require the use of large amounts of expensive engineering plastics, and the relatively large wall thickness of these tubes leads to undesirably large cable diameters.

If the material used for the core tube in central-core or tube-in-tube cables had enhanced mechanical robustness, strength members with reduced compressive stiffness could be employed, increasing cable flexibility and reducing cost. Likewise, if such a material could be utilized for buffer tubes, the thickness of the buffer tubes could be decreased. Furthermore, utilization of such a material would allow for further minimization or elimination of troublesome cable gel. Accordingly, what is sought is a core tube/buffer tube material which would provide increased resistance to crushing and other compressive deformations.

Heretofore, some cables have incorporated materials containing nucleating agents, e.g., inorganic materials, salts of aliphatic monobasic or dibasic acids, or alkali metal or aluminum, salts of aromatic or alicyclic carboxylic acids, and filler materials, e.g., talc, glass fiber, and glass spheres, into buffer or core tubes to give the desired properties of high strength, low shrinkage, good flexibility, improved processibility and low cost. An example of such a cable is described in U.S. Pat. No. 5,574,816, (the '816 patent) issued to Yang et al. Because the fillers or nucleating agents disclosed in the '816 patent were not fully effective when added to the core or buffer tubes, there is still a need for buffer tube or core tube materials with enhanced mechanical properties. Furthermore, the '816 patent only added the fillers to a polyethylene-polypropylene copolymer resin and does not address the use of fillers that can be added to other types of resins.

Thus, a heretofore unaddressed need exists in the industry to address the aforementioned deficiencies and inadequacies.

SUMMARY OF THE INVENTION

The foregoing problems have been overcome by a communication cable including an outer jacket and either a core tube or plurality of buffer tubes disposed around a central strength member, wherein the core tube or buffer tubes include a resin and high aspect ratio fillers occupying a predetermined volume of the core tube or buffer tube so as to impart crush resistance to the cable. In one embodiment of the invention, the fillers are made of smectite clay, and the smectite clay fillers may be either montmorillonite, kaolinite hectorite, synthetic smectite clays or bentonite. Possible examples of the types of resin that may be incorporated into the core or buffer tubes include for example, but are not limited to impact-modified polypropylene, polyethylenes, polybutylene terephthalate, polycarbonate, ethylene-vinyl acetate copolymers, and polyvinyl chloride and thermoplastic elastomers.

In an alternative embodiment of the present invention, the core tube or the buffer tubes of the cable of the present invention may include two layers, an inner layer and an outer layer, wherein the outer layer includes both resin and fillers, and the inner layer includes a resin without fillers.

BRIEF DESCRIPTION OF THE SEVERAL VIEWS OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE INVENTION

Figure 1:
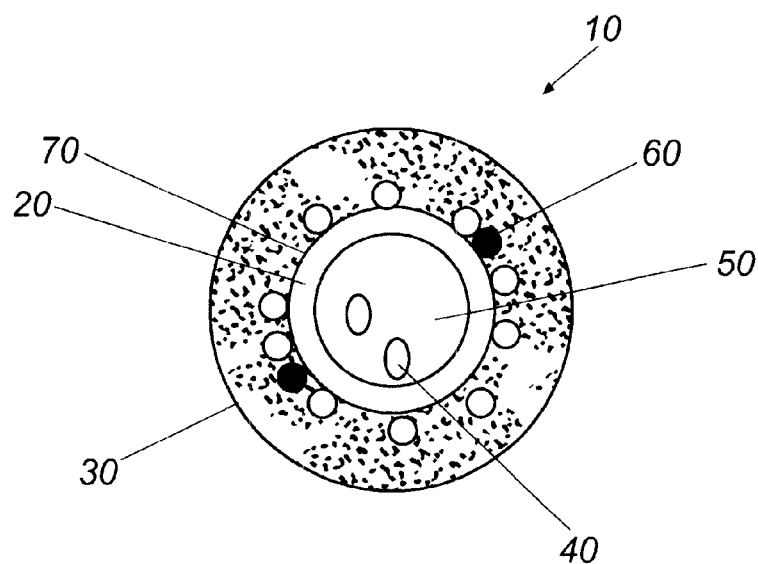
FIG. 1 is a cross-sectional end view of a standard dielectric central core cable design of the present invention.

FIG. 1 discloses a standard central-core dielectric cable 10 having a core tube 20 including a resin and fillers, disposed within an outer jacket 30. Disposed within core tube 20 are transmission media 40 and, optionally, a filling compound 50. The transmission media 40 typically comprise groups of optical fibers that are bundled together as units. The bundling of the optical fibers may be in the form of planar arrays of optical fibers, also known as ribbons. Alternately the filling compound 50 may be replaced by waterblocking provisions containing superabsorbent polymers. A ripcord 60, for example Kevlar yarn, facilitates removal of the outer jacket 30. Additionally, strength in members 70 are disclosed here as ten glass rovings, 0.022 inches×0.054 inches. The purpose of the strength members 70 is to provide tensile stiffness when an axial load is applied to the cable 10 and to keep this load from being transmitted to the transmission media 40 within the central core 20.

Desirably, the strength members 70 possess negligible compressive stiffness as these components are very flexible and can be as much as 70% less in cost than rigid dielectric strength members, such as epoxy-glass rods, which have significant compressive as well as tensile stiffness. The strength members 70 may be impregnated glass rovings;

however, other materials, metallic or non-metallic, such as glass or Kevlar® yarn can be used. Also, the strength members 70 can be composite structures. These strength members are an integral part of the jacket 30 and function together as a unit.

Figure 2:
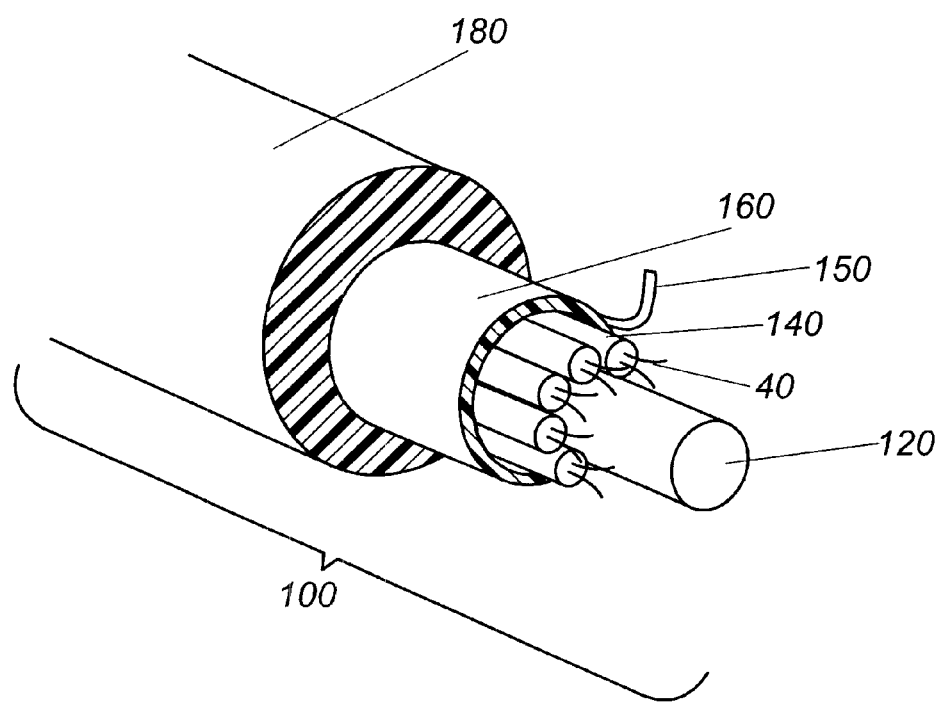
FIG. 2 is a cutaway section view of a standard buffer tube cable design of the present invention.

FIG. 2 is a cutaway illustration of another embodiment of a fiber optic cable of the present invention. The loose tube or buffer tube fiber optic cable 100 incorporates a central strength member 120. A plurality of buffer tubes 140 is stranded around the central strength member 120. Optical fibers 130 are contained within the buffer tubes 140. Generally, in addition to the optical fibers 130, the buffer tubes 140 may be filled with gel, in order to block water penetration. Alternately, superabsorbent polymers may be contained within the buffer tubes to block water penetration. Radial strength yarns 160 are wrapped around the central strength member 120 and the buffer tubes 140. A ripcord 150 is placed in a position such that the radial strength yarns 160 and outer layers of the fiber optic cable 100 can be at least partially removed to access the inner layers in the field. Additionally, armor such as a metallic shield (not shown) can be placed around the central strength member 120, buffer tubes 140, and the yarns 160 to further protect the cable 100. Lastly, an outer jacket 180 is placed around the internal components of the fiber optic cable 100.

The specific design of these strength members and the complete sheath system are not critical to the novel aspects of the present invention. However, for the sake of completeness, various forms of acceptable sheath designs and constructions are provided in the following commonly assigned U.S. Pat. Nos. 4,078,853 to Kempf, et al.; 4,826,278 to Gartside, et al.; 4,844,575 to Kinard, et al.; 5,082,348 to Gartside, et al.; and 5,109,457 to Panuska et al., all of which are incorporated herein by reference.

Crush resistance is critical in fiber optic cables. As the use of conventional filling compounds is reduced, or even eliminated completely, crush resistance becomes even more critical. To improve crush resistance, extrudable thermoplastics containing "nanoclay" clay fillers may be employed as core tubes, or as buffer tubes.

For clay platelike fillers, the aspect ratio may be defined as a=D/t, where "a" is aspect ratio, "D" is particle diameter, and "t" is particle thickness, measured for a group of particles. If the particle is modeled as an ellipse, the diameter may be calculated as the average of the major and minor axes of the ellipse. This mode of calculating aspect ratio is known in the art and is described in *Polymer Engineering and Science*, v. 23, p. 766, by C. Busigin, G. M. Martinez, R. T. Woodhams and R. Lahtinen, 1983 and is hereby incorporated by reference. Typically, aspect ratio of a particular sample is measured by optical microscopy and subsequent image analysis. The aspect ratio of individual members of a population is calculated by applying the above definitions to data for diameter, length, and thickness, and an average of these values is reported. To be effective at boosting flexural modulus and crush resistance, the clays would, in the preferred embodiment, have a high aspect ratio. In the preferred embodiment, the aspect ratio would be at least 10. Clays of this nature are typically available with aspect ratios in the range from 100–1500.

Any type of high aspect ratio clay filler should be workable in the present invention. Examples of clay fillers include but are not limited to, montmorillonite, hectorite, bentonite, kaolinite, attapulgite, and vermiculite, synthetic smectite clays, and other smectite clays. As the most abundant of the smectite clays, montmorillonite is used in the preferred embodiment of the invention. To maintain the other desirable qualities of jacket 30, such as high elongation at break and cutability, volumes ranging from 0.5 to 25% of fillers are used. Assuming a perfect composite, i.e., "perfect" coupling between the resin and the fillers, theoretical calculations indicate that the optimal aspect ratio for the fillers is 25 to 30:1.

Relative to their size, clays incorporated into the present invention have high surface areas. The thickness of the clay particles is, in a preferred embodiment, at least $5 \times 10^{-10}$ meters. The average diameter of the clay particles in the preferred embodiment is at least $5 \times 10^{-9}$ meters, although, more preferably, the particles will average approximately $5 \times 10^{-8}$ meters.

To be compatible with the thermoplastic resin that is incorporated into the core or buffer tubes of the present invention, the clays must be purified and then treated, or modified, in order to make the polar clay surface less polar. In order to treat the surface of the clay particles, the surface must have an organic functionality, or be "organophilic." In the preferred embodiment, functional amines are usually used to treat the surface of the clay particles. The polarity of the functional group of the amines used will depend on the polarity of the base resin. For example, a very nonpolar resin such as polypropylene, a molecule with a long hydrocarbon tail would be employed, e.g., octadecylamine.

Treatment or modification of the clay particles' surfaces can be accomplished via at least two different mechanisms, ion exchange and ion-dipole interaction. Further, the edges of the platelet of the clay particles can also be treated with traditional silane coupling agents, but because the edges account for less than one percent of the total surface area, silane-coupling is usually used in addition to ion exchange or ion-dipole treatment. For example, the average surface area for montmorillonite in its totally dispersed (exfoliated) state is approximately 700 square meters/gram.

Purity of the clay particles used as fillers in the present invention is desired. For example, montmorillonite as mined contains between 5 and 35% impurities. These impurities may act as stress concentrator, resulting in poor impact resistance. Thus, the clay fillers, for example montmorillonite, are at least 97.5% pure in the preferred embodiment. Commercial clays that are available that are suitable include for example but are not limited to Cloisite® 25A, Cloisite® 20A, and Cloisite® 15A from Southern Clay Products, Inc. of Gonzales, Tex.

A variety of base resins may be used in the present invention. Very effective resins appear to include linear low-density polyethylene (LLDPE), ethylene-vinyl acetate copolymer (EVA), and impact-modified isotactic polypropylene, which is typically a copolymer of polypropylene and ethylene/propylene rubber. However, high-density polyethylene (HDPE), medium-density polypropylene (MDPE), low-density polypropylene (LDPE), polybutylene terephthalate, ethylene-ethyl acrylate (E-EA) copolymers, polyamides, polyvinyl chloride, and thermoplastic elastomers can all function as appropriate base resins for the jacket 30. Examples of thermoplastic elastomers that may be used include for example, but are not limited to, Kraton™, commercially available from Shell Chemical Company in Belpre, Ohio and Hytrel®, commercially available from E.I. duPont deNemours & Company in Wilmington, Del. Impact modified polypropylene is used in the preferred embodiment due to being less costly.

Jacket 30 can also be made from polybutylene terephthalate (PBT), polycarbonate (PC), a layered combination of PBT and PC, or a polyamide such as Nylon-12. The PBT, PC or Nylon are good materials for making buffer or core tubes because they are materials that have high Young's modulus and low thermal expansion coefficients. However, such materials also have some disadvantages when compared to other materials such as polyethylene or polypropylene-polyethylene copolymers. These disadvantages include higher cost, lower flexibility, moisture sensitivity, and increased difficulty in handling and processing due to the mechanical properties of the materials.

Figure 3:
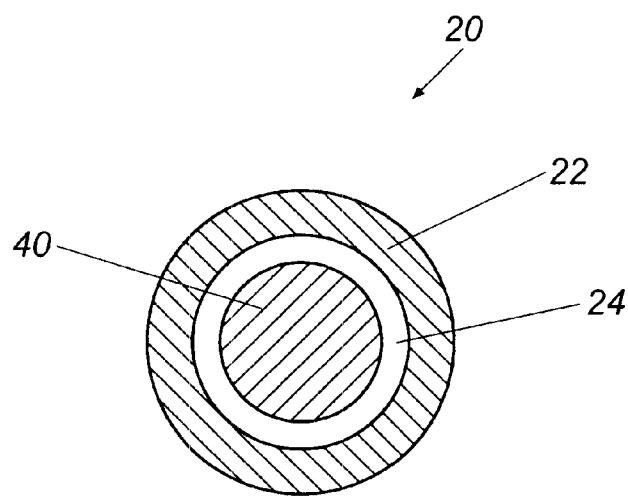
FIG. 3 is a cross-sectional end view of the central core of one embodiment of the cable of FIG. 1.
Figure 4:
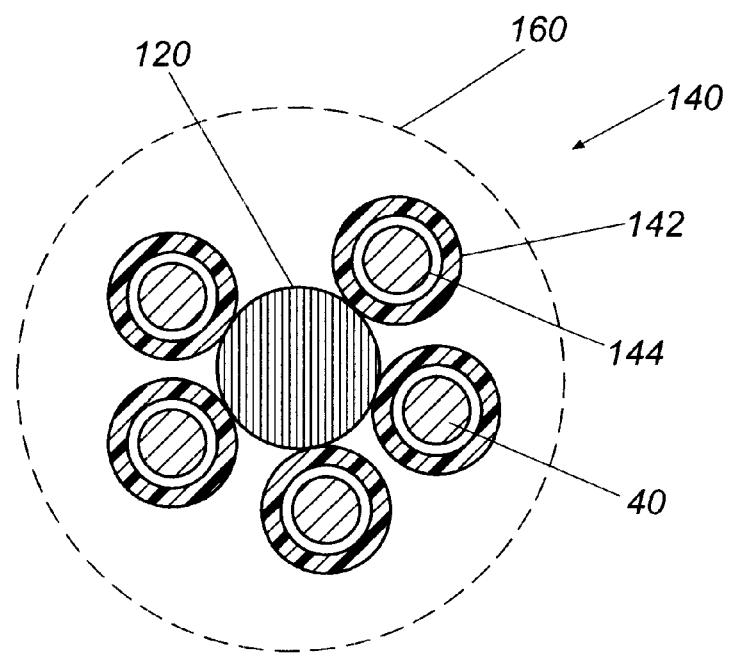
FIG. 4 is a cross-sectional end view of the buffer tubes of one embodiment of the cable of FIG. 2.

FIGS. 3 and 4 are cross sectional views of alternative embodiments of the core tube and buffer tubes of the cables of FIGS. 1 and 2, respectively. In FIG. 3 the core tube 20 may be made of two layers: the outer layer 22, filled with the clay fillers, and the inner layer 24 that is an unfilled resin. The optical fibers 40 lie within the inner layer 24. FIG. 4 depicts the buffer tubes 140 of FIG. 4. In this alternative embodiment, the buffer tubes 140, which are disposed around the central strength member 120, but disposed within the radial strength yarns 160, may also include two layers: the outer layer 142, that includes the clay fillers, and an unfilled layer 144 which includes the resin without the clay fillers. The optical fibers 40 are disposed within the inner layer 144. The two layer tubes 140 disclosed in FIGS. 3 and 4 may be utilized if special properties of the cable are desired, e.g., a very soft inner tube surface, a smooth inner surface, or an inner surface with controlled thermal expansion or shrinkage.

Many types of fibers and arrangements thereof may be disposed within the core or buffer tubes of the present invention. These fibers include for example, but are not limited to: loose fibers, with or without a cushioning gel; fiber bundles, with or without a cushioning gel; small fiber tubes, e.g., those disclosed by U.S. Pat. No. 5,751,880 to Gaillard; encased ribbon stacks, e.g., those disclosed in U.S. Pat. No. 5,896,482 to Blee, et al.; formed units around loose fibers or fiber ribbons; fiber ribbons, with or without a gel; and large tubes containing fiber.

Many variations and modifications may be made to the above-described embodiment(s) of the invention without departing substantially from the spirit and principles of the invention. All such modifications and variations are intended to be included herein within the scope of the present invention.

Therefore, having thus described the invention, at least the following is claimed:

1. A fiber optic cable comprising:
    an outer jacket for the cable; and
    a core tube, wherein the core tube comprises
        a plurality of optical fibers;
        a resin; and
        high aspect ratio clay fillers occupying a predetermined volume of the core tube so as to impart crush resistance to the cable.

2. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the fillers are smectite clay.

3. The cable of claim 2, wherein the smectite clay fillers are selected from the group consisting of: montmorillonite, kaolinite, hectorite, synthetic smectite clays and bentonite.

4. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the fillers comprise a surface that is organophilic.

5. The cable of claim 4, wherein the fillers are surface-treated to render the filler surface less polar.

6. The cable of claim 4, wherein the fillers are surface-treated with a functional amine that is compatible with the resin.

7. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the aspect ratio of the fillers is at least 10.

8. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the aspect ratio of the fillers ranges from approximately 100 to approximately 1500.

9. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the thickness of fillers is at least $5 \times 10^{-10}$ meter.

10. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the average diameter of the fillers is at least $5 \times 10^{-9}$ meter.

11. The cable of claim 10, wherein the average diameter of the fillers is approximately $5 \times 10^{-8}$ meter.

12. A fiber optic cable comprising:
    an outer jacket for the cable; and
    a core tube, wherein the core tube comprises
        a plurality of optical fibers,
        a resin, and
        high aspect ratio fillers occupying a predetermined volume of the core tube so as to impart crush resistance to the cable, wherein the fillers in the core occupy a volume between approximately 0.01% to approximately 18%.

13. The cable of claim 1, wherein the filler is at least approximately 97.5% pure.

14. A fiber optic cable comprising:
an outer jacket for the cable; and
a core tube, wherein the core tube comprises
a plurality of optical fibers,
a resin, wherein the resin is selected from the group consisting of: impact-modified polypropylene, polyethylenes, polycarbonate, ethylene-vinyl acetate copolymers, ethylene-ethyl acrylate copolymers, polyvinyl chloride and thermoplastic elastomers, and
high aspect ratio fillers occupying a predetermined volume of the core tube so as to impart crush resistance to the cable.

15. A fiber optic cable comprising:
an outer jacket for the cable; and
a core tube, wherein the core tube comprises
a plurality of optical fibers,
an inner layer including a resin,
an outer layer including a resin and fillers, and
high aspect ratio fillers occupying a predetermined volume of the core tube so as to impart crush resistance to the cable.

16. A fiber optic cable comprising:
an outer jacket for the cable; and
at least one buffer tube, wherein the buffer tube comprises
a plurality of optical fibers;
a resin; and
high aspect ratio clay fillers occupying a predetermined volume of the buffer tube so as to impart crush resistance to the cable.

17. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the fillers are smectite clay.

18. The cable of claim 17, wherein the smectite clay fillers are selected from the group consisting of: montmorillonite, kaolinite, hectorite, synthetic smectite clays and bentonite.

19. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the fillers comprise a surface that is organophilic.

20. The cable of claim 19, wherein the fillers are surface-treated to render the filler surface less polar.

21. The cable of claim 19, wherein the fillers are surface-treated with a functional amine that is compatible with the resin.

22. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the aspect ratio of the fillers is at least 10.

23. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the aspect ratio of the fillers ranges from approximately 100 to approximately 1500.

24. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the thickness of fillers is at least $5 \times 10^{-10}$ meter.

25. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the average diameter of the fillers is at least $5 \times 10^{-9}$ meter.

26. The cable of claim 25, wherein the average diameter of the fillers is approximately $5 \times 10^{-8}$ meter.

27. A fiber optic cable comprising:
an outer jacket for the cable; and
a core tube, wherein the core tube comprises
a plurality of optical fibers,
a resin, and
high aspect ratio fillers occupying a predetermined volume of the core tube so as to impart crush resistance to the cable, wherein the fillers in the core occupy a volume between approximately 1.5% to approximately 25%.

28. The cable of claim 1, wherein the filler is at least approximately 97.5% pure.

29. A fiber optic cable comprising:
an outer jacket for the cable; and
a core tube, wherein the core tube comprises
a plurality of optical fibers,
a resin, wherein the resin is selected from the group consisting of: impact-modified polypropylene, polyethylenes, polycarbonate, ethylene-vinyl acetate copolymers, ethylene-ethyl acrylate copolymers, polyvinyl chloride and thermoplastic elastomers, and
high aspect ratio fillers occupying a predetermined volume of the core tube so as to impart crush resistance to the cable.

* * * * *